United States Patent
Maeda

(10) Patent No.: US 12,420,949 B2
(45) Date of Patent: Sep. 23, 2025

(54) DRAWING APPARATUS AND FLIGHT VEHICLE

(71) Applicant: TOYOTA JIDOSHA KABUSHIKI KAISHA, Toyota (JP)

(72) Inventor: Kazuhisa Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 291 days.

(21) Appl. No.: 18/087,319

(22) Filed: Dec. 22, 2022

(65) Prior Publication Data

US 2023/0202677 A1 Jun. 29, 2023

(30) Foreign Application Priority Data

Dec. 27, 2021 (JP) .................................. 2021-212698

(51) Int. Cl.
  *B64D 45/08* (2006.01)
  *B64C 39/02* (2023.01)
  *B64U 70/00* (2023.01)

(52) U.S. Cl.
  CPC ............ *B64D 45/08* (2013.01); *B64C 39/024* (2013.01); *B64U 70/00* (2023.01)

(58) Field of Classification Search
  CPC ...... B64D 45/08; B64D 47/06; B64C 39/024; B64U 70/00; B64U 10/13
  See application file for complete search history.

(56) References Cited

U.S. PATENT DOCUMENTS

| | | | |
|---|---|---|---|
| 11,522,600 B1* | 12/2022 | Rakib | H04B 7/0613 |
| 2016/0280393 A1 | 9/2016 | Mouton et al. | |
| 2016/0290912 A1* | 10/2016 | Kent | G01N 35/00871 |
| 2018/0002010 A1* | 1/2018 | Bauer | G05D 1/689 |
| 2019/0293539 A1* | 9/2019 | Manautou | G01N 33/4925 |
| 2020/0174129 A1* | 6/2020 | Abdelkader | G08G 5/21 |
| 2021/0107643 A1 | 4/2021 | Nagai et al. | |
| 2022/0050093 A1* | 2/2022 | Scheiner | G06Q 50/02 |
| 2024/0043138 A1* | 2/2024 | Schumann | B64U 20/80 |

FOREIGN PATENT DOCUMENTS

WO 2019/181894 A1 9/2019

* cited by examiner

*Primary Examiner* — Anne Marie Antonucci
*Assistant Examiner* — Luis G Del Valle
(74) *Attorney, Agent, or Firm* — Dinsmore & Shohl LLP

(57) ABSTRACT

A drawing apparatus draws an illumination image by illuminating visible light onto a landing point on which a flight vehicle is to land. The drawing apparatus includes a focusing mechanism that executes focusing of the illumination image according to an altitude of the flight vehicle, and an illumination angle adjustment mechanism that adjusts an illumination angle of the visible light toward the landing point.

8 Claims, 6 Drawing Sheets

DRAWING APPARATUS AND FLIGHT VEHICLE

CROSS REFERENCE TO RELATED APPLICATION

This application claims priority to Japanese Patent Application No. 2021-212698 filed on Dec. 27, 2021, which is incorporated herein by reference in its entirety including the specification, claims, drawings, and abstract.

TECHNICAL FIELD

The present disclosure relates to a drawing apparatus which draws an illumination image by illuminating visible light at a landing point on which a flight vehicle is to land, and to a flight vehicle.

BACKGROUND

In recent years, unmanned flight vehicles (which are also called "drones") which are maneuvered wirelessly are used in various situations. In WO 2019/181894 A1, as an alert apparatus, a light projection apparatus is provided which illuminates visible light in a velocity vector direction of the flight vehicle. With such an alert apparatus, it becomes easier for people in the surrounding area or the like to recognize the existence of the flight vehicle. The document also describes adjustment of an amount of light of the visible light according to an altitude measured by an altimeter.

In WO 2019/181894 A1, because the visible light is illuminated in the direction of travel and the amount of light is varied according to the altitude, people around an expected reaching point can easily recognize the light ray. However, with the adjustment of the amount of light according to the altitude alone, the range illuminated by the light is not clear, and it is difficult for people on the ground to understand an accurate landing point.

SUMMARY

According to one aspect of the present disclosure, there is provided a drawing apparatus which draws an illumination image by illuminating visible light onto a landing point on which a flight vehicle is to land, the drawing apparatus comprising: a focusing mechanism that executes focusing of the illumination image according to an altitude of the flight vehicle; and an illumination angle adjustment mechanism that adjusts an illumination angle of the visible light toward the landing point.

According to another aspect of the present disclosure, there is provided a flight vehicle which draws an illumination image on a landing point, the flight vehicle comprising: an altitude measurement apparatus that measures an altitude of the flight vehicle; and a drawing apparatus that draws an illumination image by illuminating visible light toward ground, wherein the drawing apparatus comprises: a focusing mechanism which executes focusing of the illumination image according to an altitude measured by the altitude measurement apparatus; and an illumination angle adjustment mechanism which adjusts an illumination angle of the visible light toward the landing point.

According to an aspect of the present disclosure, because the focusing is executed according to the altitude of the flight vehicle, the illumination image can be drawn in an appropriate range.

BRIEF DESCRIPTION OF DRAWINGS

Embodiment(s) of the present disclosure will be described based on the following figures, wherein.

DESCRIPTION OF EMBODIMENTS

An embodiment of the present disclosure will now be described with reference to the drawings. The present disclosure, however, is not limited to the embodiment described herein.

Overall Structure

Figure 1:
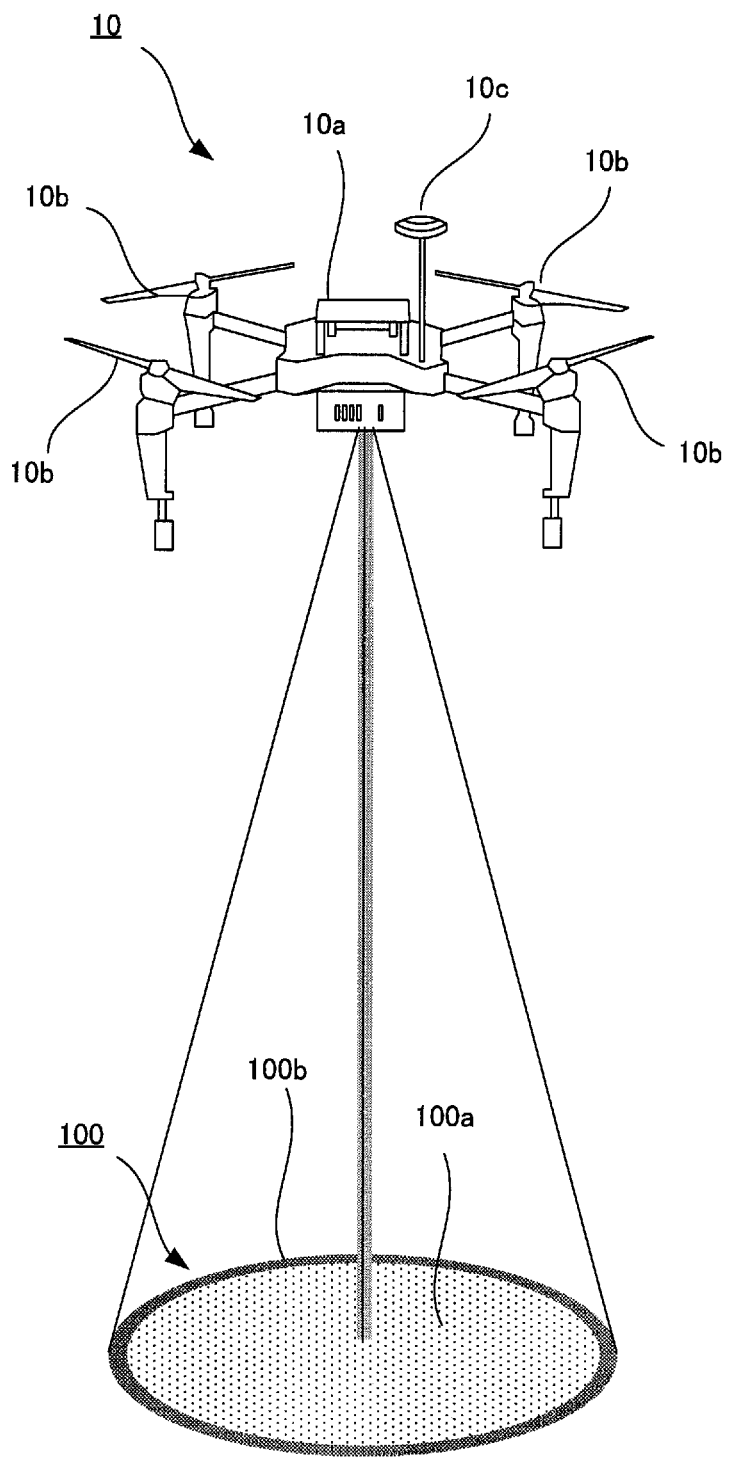
FIG. 1 is a schematic diagram for explaining an exterior appearance of a flight vehicle 10 according to an embodiment of the present disclosure, and a function during landing.

FIG. 1 is a schematic diagram for explaining an exterior appearance of a flight vehicle 10 according to an embodiment of the present disclosure, and a function during landing. The flight vehicle 10 comprises a body 10a, four propellers 10b, and an antenna 10c. The flight vehicle 10 takes off, flies, and lands by controlling rotational driving of the four propellers 10b. FIG. 1 shows a situation during landing, and a circular drawing pattern 100 is drawn on a landing point as an illumination image. In the drawing pattern 100, a landing area 100a which is the landing point is displayed with a certain color and at a certain brightness, and a periphery thereof is framed by a circular frame 100b having a different color and/or a different brightness. With the display of such a drawing pattern, people in the surrounding area can easily recognize the landing area 100a of the flight vehicle 10. As will be described below, for the drawing pattern 100, various pictures and texts may be employed, various colors and brightnesses may be employed, and any of these parameters may be suitably changed.

Figure 2:
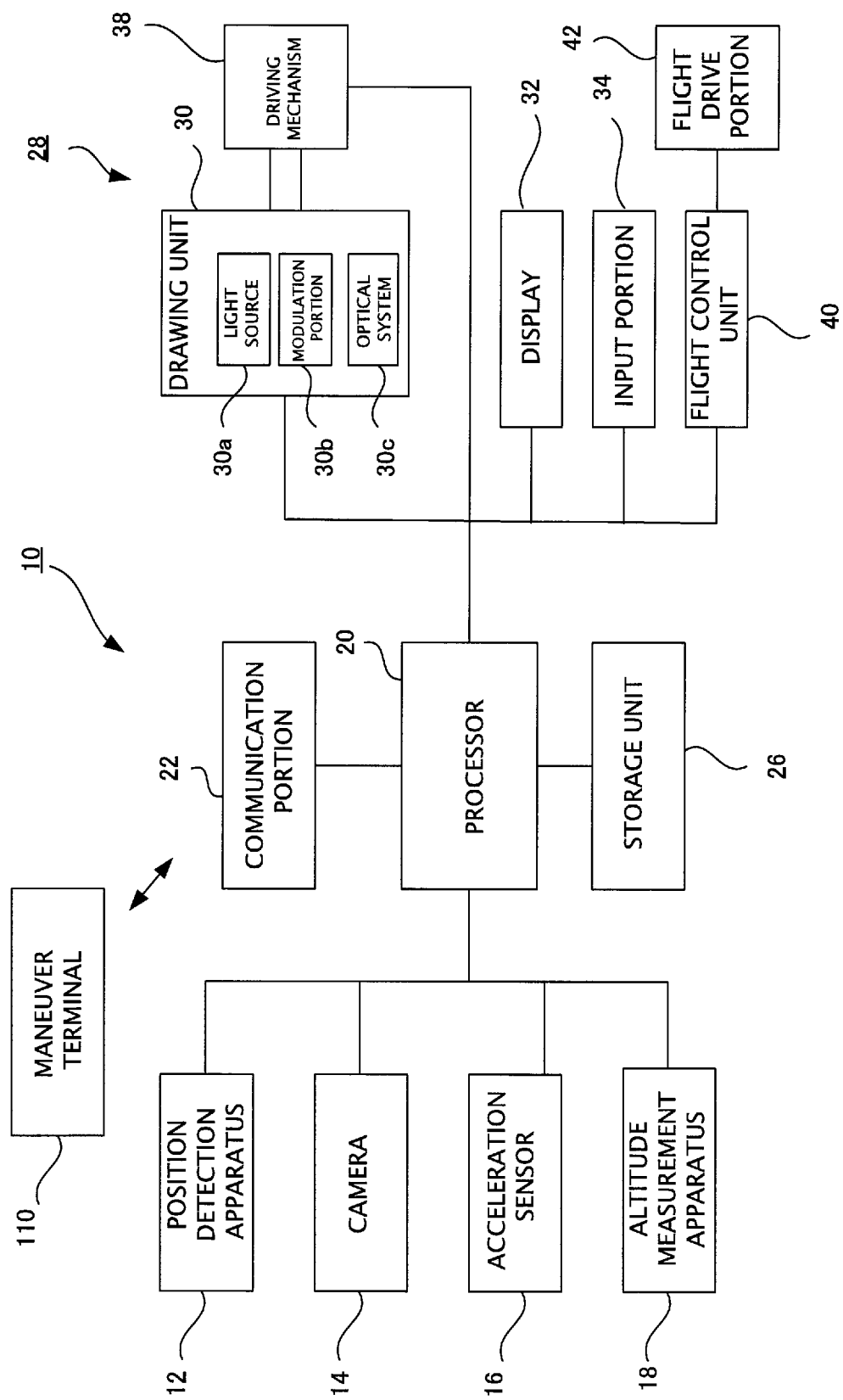
FIG. 2 is a block diagram showing a structure of a flight vehicle 10 equipped with a drawing apparatus according to an embodiment of the present disclosure.

FIG. 2 is a block diagram showing a structure of the flight vehicle 10 equipped with a drawing apparatus 28 according to an embodiment of the present disclosure. In the illustrated example structure, the drawing apparatus 28 comprises a drawing unit 30 and a driving mechanism 38.

A position detection apparatus 12 includes a GNSS (Global Navigation Satellite System) such as the GPS (Global Positioning System), and detects a position of the flight vehicle.

A camera 14 acquires a video image of the periphery. For the camera 14, an imaging element such as a CCD (Charge Coupled Device) and CMOS (Complementary MOS) may be employed.

An acceleration sensor 16 detects acceleration. Various structures may be employed for the acceleration sensor 16. A plurality of the acceleration sensors may be provided to detect three-dimensional acceleration, and a velocity vector may be determined based on a detection result.

An altitude measurement apparatus 18 detects a distance from the ground as an altitude. A laser distance meter which illuminates laser and detects reflected light, or various distance sensors which use radio waves, ultrasound, or the like, may be employed. Further, an apparatus which measures a distance to a target based on a parallax of a stereo-captured image, and a LIDAR (Light Detection and Ranging, or Laser Imaging Detection and Ranging) may be employed. The position detection apparatus 12 can detect a three-dimensional position, and can detect the altitude, if the elevation of the ground is known from map data. Alternatively, a plurality of detection devices may be employed in combination. Alternatively, three-dimensional map information may be stored in advance, and a distance between the flight vehicle 10 and the landing point, and a direction to the landing point, may be determined based on a three-dimensional position of the flight vehicle 10 detected by the position detection apparatus 12 or acquired by a manometer, or the like, and the three-dimensional position of the landing point.

Signals from the position detection apparatus 12, the camera 14, the acceleration sensor 16, and the altitude measurement apparatus 18 are supplied to one or more processors 20. Each of the one or more processors 20 is formed from a computer having a computation unit such as a CPU, and a storage unit such as a RAM, a ROM, or the like, and executes various data processes by executing various programs stored in the storage unit. In the example configuration, the one or more processors 20 causes a drawing pattern of a predetermined shape to be drawn on a landing area of the landing point during landing.

A communication portion 22 is connected to the one or more processors 20. The communication portion 22 executes various wireless communications with an external communication device. The flight vehicle 10 receives commands on the velocity vector such as the direction of travel and the velocity, from an external maneuvering terminal 110. Further, the communication portion 22 can transmit a detection result of the position detection apparatus 12, the video image of the peripheral environment, or the like, via the communication portion 22. For the external maneuvering terminal 110, a personal computer, a smartphone, or the like may be employed, and various data exchanges can be performed through a communication line such as the Internet.

A display 32 and an input portion 34 are connected to the one or more processors 20. As the input portion 34, a touch panel using a display of the display 32 may be employed. A user may use the display 32 and the input portion 34 when the user sets various parameters for the flight vehicle 10.

A flight drive portion 42 is connected to the one or more processors 20 via a flight control unit 40. The flight drive portion 42 includes a motor, the propeller 10*b* (refer to FIG. 1), and the like. The user may control flight of the flight vehicle 10 by operating an external terminal such as the smartphone. For example, the one or more processors 20 may transmit at all times an image captured by the camera 14, a current position of the flight vehicle 10 detected by the position detection apparatus 12, a velocity vector detected by the acceleration sensor 16, data such as the altitude measured by the altitude measurement apparatus 18, and the like, via the transmission portion 22, so that the user can understand the status of the flight vehicle 10 at all times. The user than sends a control signal for the flight of the flight vehicle 10, and the flight control unit 40 controls the flight drive unit 42 according to the control signal, so as to realize a desired flight.

Alternatively, a flight path may be set in advance, and the flight control unit 40 may execute autonomous flight so that flight according to the desired flight path is realized. Alternatively, dedicated control programs may be stored for landing, take-off, or the like, and the taking-off operation and the landing operation may be performed according to these programs. Further, a configuration may be employed in which the flight vehicle basically flies autonomously, and the user corrects the flight as desired.

Structure for Drawing

A storage unit 26 is connected to the one or more processors 20, and stores various programs and data. Further, the storage unit 26 stores a drawing pattern to be drawn on the ground by the drawing unit 30 to be described below. The drawing pattern corresponds to an illumination image. Alternatively, a plurality of the drawing patterns may be stored, and the user may choose from the stored drawing patterns.

The drawing unit 30 is connected to the one or more processors 20. The drawing unit 20 is a device that draws a predetermined drawing pattern at the landing point, and projects the drawing pattern onto the ground using light from an LED or the like. The one or more processors 20 read the drawing pattern from the storage unit 26, and supply the drawing pattern to the drawing unit 30, and the drawing unit 30 draws this pattern.

The drawing unit 30 may be realized by various devices. For example, a structure may be employed comprising a light source 30*a*, a modulation portion 30*b*, and an optical system 30*c*, in which light from the light source 30*a* is modulated by the modulation portion 30*b*, and the modulated light is projected by the optical system 30*c* onto a predetermined position on the ground. The light source 30*a* may be formed from an LED, the modulation portion 30*b* may be formed from a reflective digital light deflector device (DMD), and the optical system 30*c* may be formed from a zoom lens including a plurality of lenses, a mirror, or the like. Alternatively, for the modulation portion 30*b*, a transmission-type liquid crystal projector or the like may be employed.

With the structure described above, the drawing pattern acquired by the modulation portion 30*b* can be adjusted by the optical system 30*c* and a drawing pattern of a predetermined shape can be drawn on the ground.

The optical system 30*c* is a zoom lens, and has a focus adjustment function. With the optical system 30*c*, the drawing pattern is drawn at a position of a predetermined distance in a state in which the drawing pattern is focused at a predetermined size. Because the pattern is focused, text or the like may be clearly displayed. In addition, by allowing adjustment of the illumination angle, it is possible to change the focal point position on the ground.

Alternatively, a light source in which a large number of micro LEDs are arranged may be used as the light source 30*a*, and lighting of each micro LED may be controlled to form a light pattern of an arbitrary drawing pattern.

Alternatively, an arbitrary drawing pattern may be drawn on a ground surface by mechanically moving the plurality of lenses and the mirror of the optical system 30c, or controlling the magnification and direction with respect to the light pattern formed by the modulation portion 30b and the light source 30a. Further, for the optical system 30c, an electrical focus variable lens, an ultrasound focus variable lens, or the like may, be employed.

In the present embodiment, the driving mechanism 38 is provided, which physically moves the drawing unit 30. The driving mechanism 38 functions as an illumination angle adjustment mechanism. The drawing position of the drawing pattern can be arbitrarily changed by moving the drawing unit 30, to thereby change an illumination direction; that is, an illumination angle, of the light.

In this manner, the drawing unit 30 receives supply of the drawing pattern stored in the storage unit 26 from the one or more processors 20, and can draw the desired drawing pattern on the ground surface.

Alternatively, the drawing position and the size of the drawing pattern may be determined, and the focusing may be applied using a device MEMS (Micro Electro Mechanical Systems) in which a mechanical element component, a sensor, an actuator, and an electronic circuit are integrated on one silicon substrate, one glass substrate, an organic material, or the like, by a micromachining technique.

In the present embodiment, when the one or more processors 20 detect, based on the detection result of the position detection apparatus 12, that the flight vehicle has moved close to the landing point, the drawing of the drawing pattern of the predetermined size on a planned landing point is started, and the drawing is continued until the flight vehicle has landed or until a point in time immediately before the flight vehicle lands.

The drawing pattern is drawn on the landing point through the mechanical movement of the drawing unit 30 using the driving mechanism 38, and application of the focusing through the control of the optical system 30c inside the drawing unit 30. In particular, because the focusing of the drawing pattern can be executed corresponding to the altitude of the flight vehicle 10, a clear display can be realized at the drawing point.

Further, by focusing with the optical system 30c on the landing point even when the altitude changes, a constant size of the drawing pattern can be maintained, and an appropriate display may be maintained as the area display at the landing point.

Movement of Drawing Unit

In addition, in the present embodiment, the drawing unit 30 is capable of, for example, two-axis movement by the driving mechanism 38 which is a physical movement mechanism. Thus, the drawing position of the drawing pattern on the ground surface can be arbitrarily changed.

Figure 3:
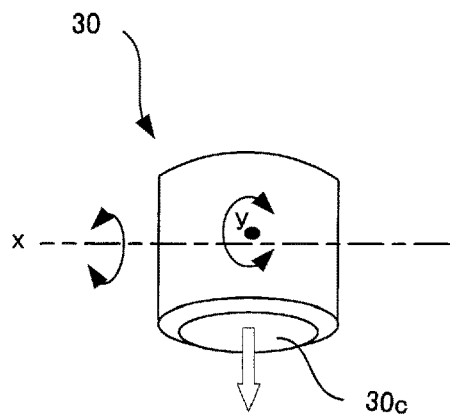
FIG. 3 is a diagram showing an attachment state of a drawing unit 30.

FIG. 3 shows attachment of the drawing unit 30. The drawing unit 30 which illuminates light toward the downward direction is placed at the center of a bottom of the flight vehicle 10. In this example configuration, the drawing unit 30 has an overall circular tubular shape, and has, at a front side thereof, a circular lens which forms a part of the optical system 30c. The drawing unit 30 as a whole is supported in a manner to be rotatable about two axes including an x axis (horizontal axis) and y axis (vertical axis).

Figure 4:
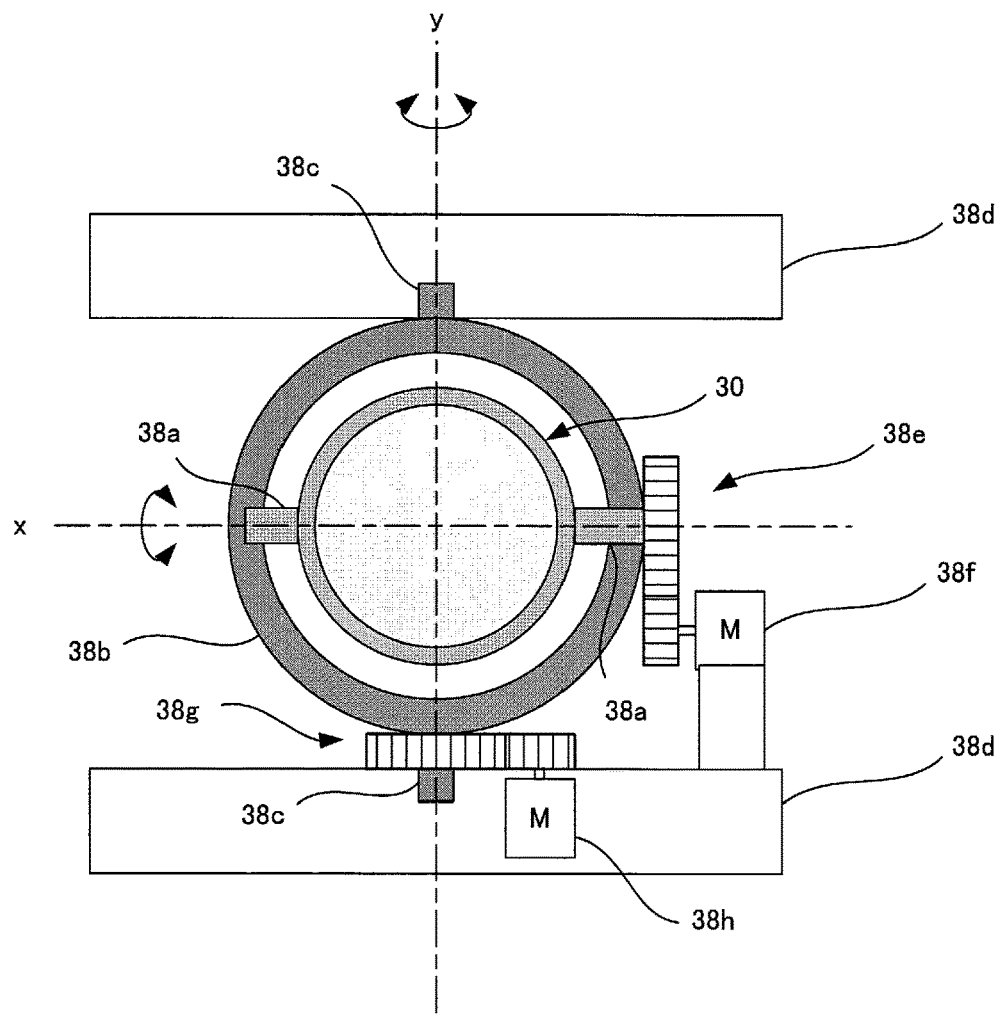
FIG. 4 is a diagram schematically showing a driving mechanism 38 which rotates a drawing unit 30.

FIG. 4 schematically shows the driving mechanism 38 which rotates the drawing unit 30. FIG. 4 conceptually shows a structure which is capable of two-axis movement.

The drawing unit 30 is rotatably supported on a circular frame 38b by a pair of horizontal shafts 38a. The circular frame 38b is rotatably supported on a body-side member 38d which is a part of the body 10a, by a pair of vertical shafts 38c. One of the horizontal shafts 38a penetrates through the circular frame 38b, and is rotated by a motor 38f via a gear mechanism 38e. In addition, the vertical shaft 38c is rotated by a motor 38h via a gear mechanism 38g.

With this configuration, the drawing unit 30 can rotate about two axes including the x-axis 38a and the y-axis 38c within a horizontal plane, and the illumination position of the drawing pattern onto the ground surface can be arbitrarily changed.

Even when the mechanical movement mechanism using the driving mechanism 38 is provided, the drawing pattern may be changed by an image processing or movement of the optical system within the drawing unit 30. By combining these devices, a number of possible choices for the drawing pattern can be increased.

Figure 5:
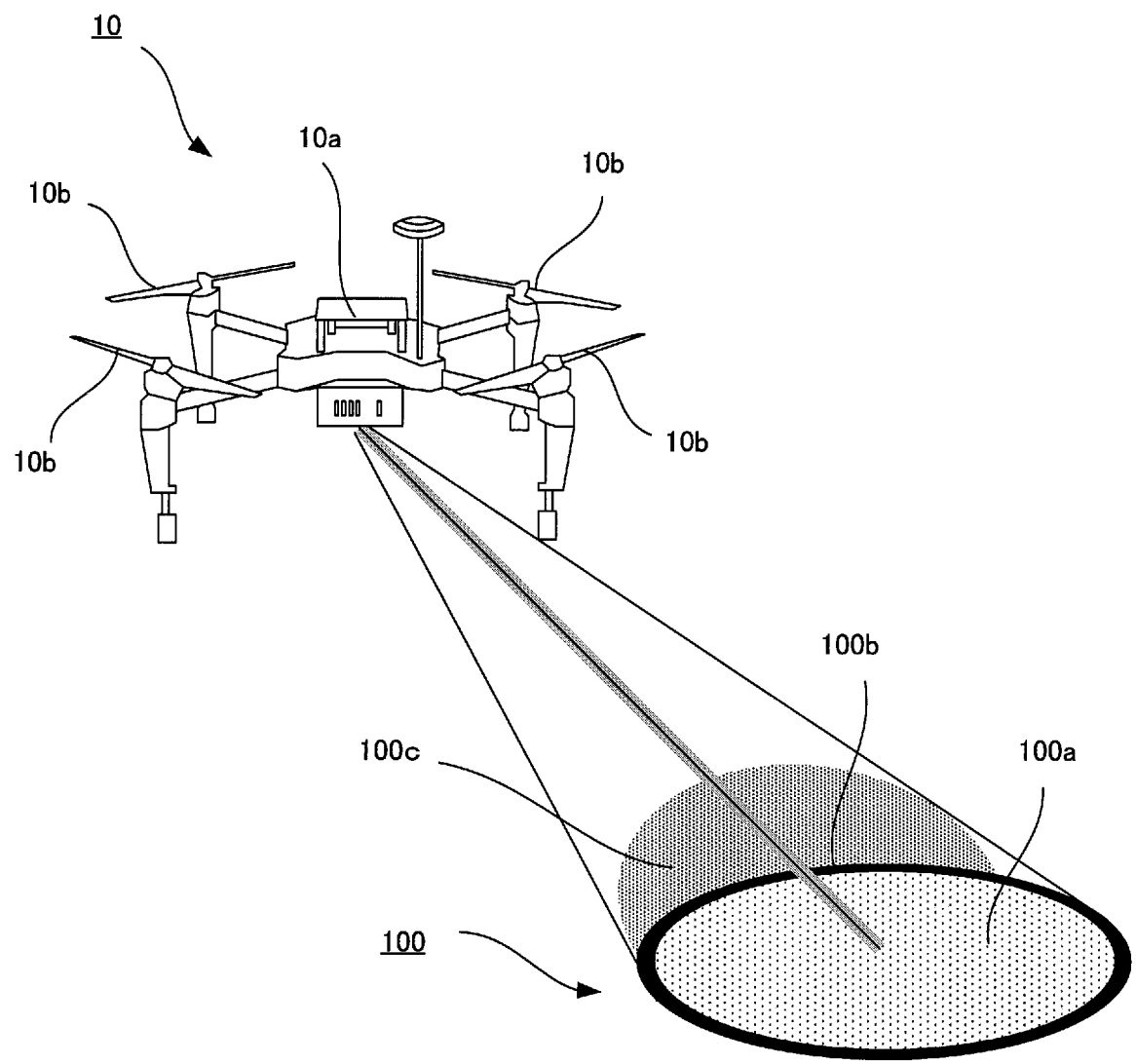
FIG. 5 is a diagram showing an example of a drawing pattern 100 when a flight vehicle 10 lands while moving in a slanted direction.

FIG. 5 shows an example of the drawing pattern 100 when the flight vehicle 10 lands while moving in a slanted direction. In this manner, the drawing pattern 100 may be displayed in a slanted direction toward the landing point. Further, in this example configuration, an additional display area 100c is displayed at a portion below a movement trajectory in the slanted direction. With this configuration, it becomes easier to understand that the flight vehicle 10 moves toward the landing point by moving in the slanted direction from the slanted position.

Figure 6A:
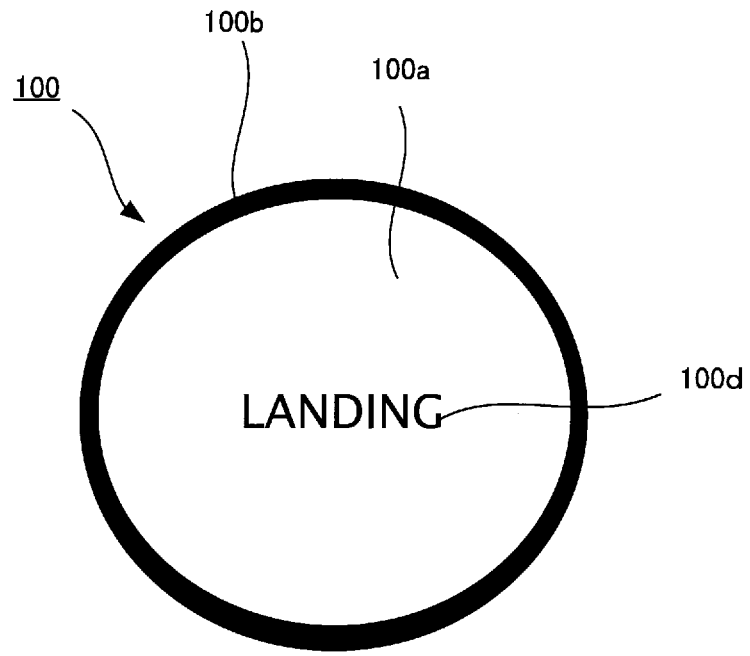
FIG. 6A is diagram showing another example of a drawing pattern, displaying a text 100d at a center part.
Figure 6B:
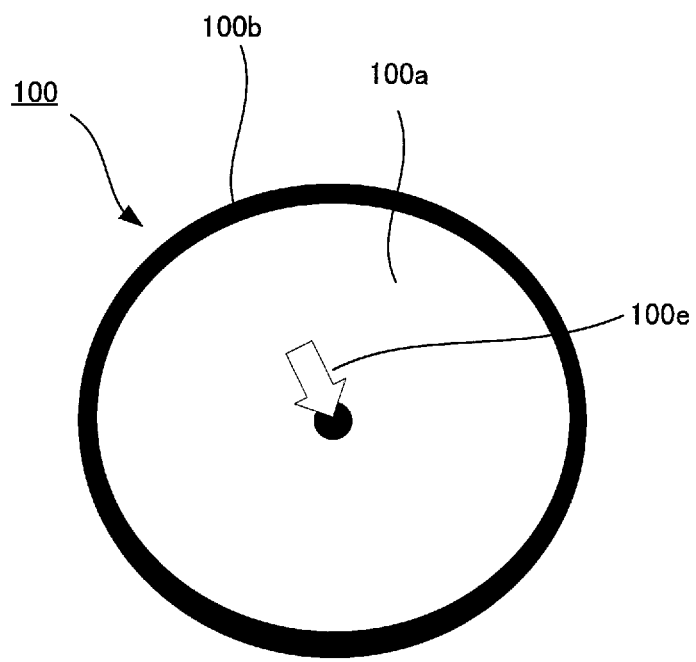
FIG. 6B is a diagram showing another example of a drawing pattern, displaying a circle showing the center and an arrow 100e showing a direction toward a landing point.

FIGS. 6A and 6B show other examples of the drawing pattern. In FIG. 6A, a text 100d is displayed at the center part, and in FIG. 6B, an arrow 100e showing a direction to reach the landing point is displayed.

For example, when there is a person near the landing point, such a display is used. For example, a situation around the landing point can be understood from the camera image, and the drawing pattern may be automatically chosen. Alternatively, the user who is maneuvering the flight vehicle may select the pattern through the remote terminal.

Process During Landing

Figure 7:
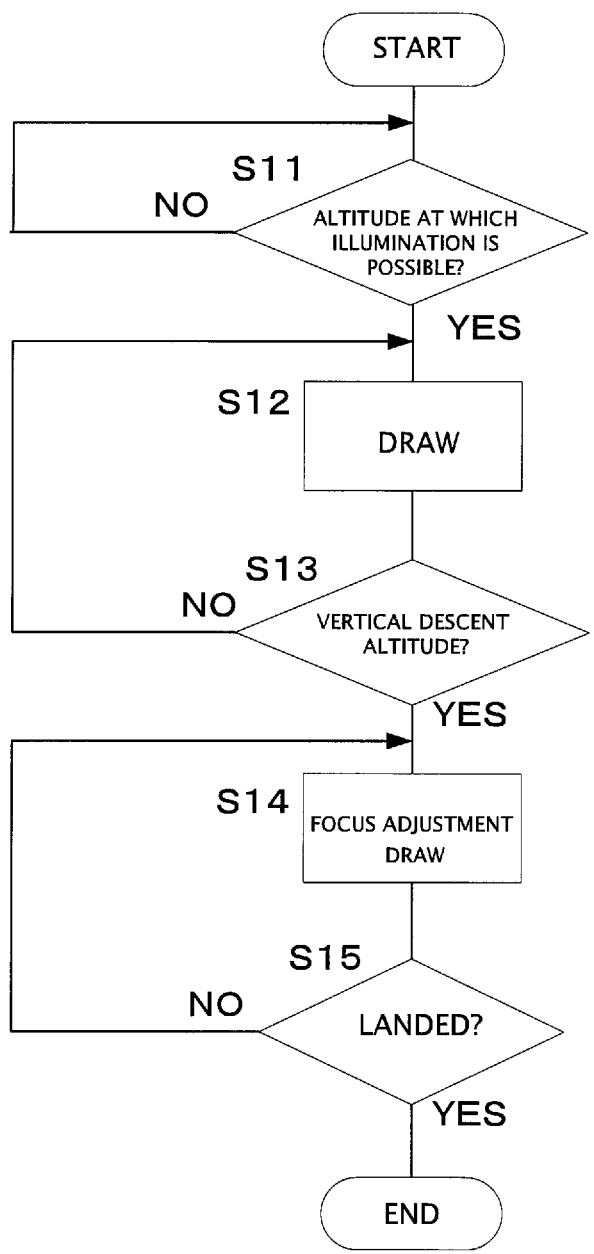
FIG. 7 is a flowchart showing a process performed by one or more processors 20 during landing.

A process performed by the one or more processors 20 during landing will now be described with reference to FIG. 7. The landing point is stored in the storage unit 26. When it is known, based on current position information from the position detection apparatus 12, that the flight vehicle is approaching the landing point, and that there is no obstruction, the vehicle flight is set in a landing mode. In the landing mode, altitude information from the altitude measurement apparatus 18 is taken in. The altitude information is distance information from the actual ground surface. It is determined whether or not the altitude is an altitude at which illumination is possible (S11). Here, altitude at which illumination is possible is an altitude where an amount of light can be secured which allows people in the surrounding area to notice the drawing pattern when the drawing unit 30 draws the drawing pattern on the ground.

When result of this judgement is NO, no process is executed. When the result of the judgement is YES in S11, the drawing is started (S12). The drawing is realized by illuminating visible light onto a planned landing point (which may also be referred to as a landing point) to display the drawing pattern of the predetermined shape. Alternatively, the drawing does not necessarily display the landing area, and may illuminate a relatively small point. When the area to be illuminated is small, a corresponding bright display can be realized, and the drawing can be started at an earlier point in time. In this state also, a display similar to that during vertical descent that will be described below may be realized.

It is then judged whether or not a vertical descending altitude has been reached (S13). This altitude is a distance corresponding to a position above a person, is about 2 to 10 m, and is set to, for example, 3 to 5 m. When result of this judgement is NO, the process returns to S12. When the result of the judgement in S13 is YES, focus adjustment corresponding to the altitude is performed, and the drawing pattern is drawn (S14). In this drawing, the optical system or the like is controlled according to the altitude for focusing on the ground, and the drawing pattern is displayed clearly and with a predetermined size. In the vertical descent, a certain degree of movement in front/rear and left/right directions is allowed, and in such a case also, the drawing apparatus 28 applies control to maintain the position, the size, and the focusing of the drawing pattern as much as possible.

It is then judged whether or not the altitude has reached 0 or a predetermined small value, for example, about 0 to 2 m (S15). When result of this judgement is NO, the process returns to S14, and when the result of the judgement is YES, the drawing process is completed.

The invention claimed is:

1. A drawing apparatus which draws an illumination image by illuminating visible light onto a landing point on which a flight vehicle is to land, the drawing apparatus comprising:
    a focusing mechanism that executes focusing of the illumination image according to an altitude of the flight vehicle, the focusing mechanism executes focusing based on the landing point so as to realize a constant size for the illumination image during landing; and
    an illumination angle adjustment mechanism that adjusts an illumination angle of the visible light toward the landing point.

2. The drawing apparatus according to claim 1, wherein the illumination image includes text.

3. The drawing apparatus according to claim 1, further comprising a processor that causes a drawing pattern of a predetermined shape to be drawn on the landing point during the landing.

4. The drawing apparatus according to claim 1, further comprising a processor that causes an additional display area to be displayed at a portion below a movement trajectory in a slanted direction.

5. A flight vehicle which draws an illumination image on a landing point, the flight vehicle comprising:
    an altitude measurement apparatus that measures an altitude of the flight vehicle; and
    a drawing apparatus that draws the illumination image by illuminating visible light toward the ground, wherein the drawing apparatus comprises:
    a focusing mechanism which executes focusing of the illumination image according to the altitude measured by the altitude measurement apparatus, the focusing mechanism executes focusing based on the landing point so as to realize a constant size for the illumination image during landing; and
    an illumination angle adjustment mechanism which adjusts an illumination angle of the visible light toward the landing point.

6. The flight vehicle according to claim 5, wherein the illumination image includes text.

7. The flight vehicle according to claim 5, further comprising a processor that causes a drawing pattern of a predetermined shape to be drawn on the landing point during landing.

8. The flight vehicle according to claim 5, further comprising a processor that causes an additional display area to be displayed at a portion below a movement trajectory in a slanted direction.

* * * * *